US011880718B2

(12) United States Patent
Noverraz et al.

(10) Patent No.: US 11,880,718 B2
(45) Date of Patent: Jan. 23, 2024

(54) SYSTEM AND METHOD FOR GENERATING SECURE PARTITION REGIONS IN OPEN AND SECURE PROCESSOR ENVIRONMENTS

(71) Applicant: Renesas Electronics Corporation, Tokyo (JP)

(72) Inventors: David Noverraz, Bourne End (GB); Paul Bell, Bourne End (GB); Kennedy Ho, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 616 days.

(21) Appl. No.: 17/021,467

(22) Filed: Sep. 15, 2020

(65) Prior Publication Data
US 2022/0083394 A1    Mar. 17, 2022

(51) Int. Cl.
| | |
|---|---|
| G06F 9/44 | (2018.01) |
| G06F 9/50 | (2006.01) |
| G06F 8/41 | (2018.01) |
| G06F 9/4401 | (2018.01) |
| G06F 21/57 | (2013.01) |

(52) U.S. Cl.
CPC .............. *G06F 9/5077* (2013.01); *G06F 8/41* (2013.01); *G06F 9/4401* (2013.01); *G06F 21/575* (2013.01)

(58) Field of Classification Search
CPC ........ G06F 9/5077; G06F 8/41; G06F 9/4401; G06F 21/575
See application file for complete search history.

(56) References Cited

U.S. PATENT DOCUMENTS

| | | | |
|---|---|---|---|
| 8,539,245 B2 | 9/2013 | Swanson et al. | |
| 10,592,671 B2* | 3/2020 | Chen | ...................... G06F 21/575 |
| 11,392,301 B2* | 7/2022 | Kloth | ....................... G06F 21/72 |
| 2004/0177261 A1 | 9/2004 | Watt et al. | |
| 2013/0298251 A1 | 11/2013 | Mittal | |

OTHER PUBLICATIONS

Extended European Search Report for EP Application No. 21194396.4 dated Feb. 4, 2022.

* cited by examiner

*Primary Examiner* — Zahid Choudhury
(74) *Attorney, Agent, or Firm* — Foley & Lardner LLP (57) ABSTRACT

Example implementations includes a method of partitioning a non-transitory memory device by detecting a boot state of a processing device including a non-transitory memory device, identifying a startup state of the processing device based on the boot state, and partitioning the memory device into at least one secure address region, in accordance with a determination that the startup state satisfies an operating state condition. Example implementations also include a method of generating a secure partition associated with a non-transitory memory device by identifying a target processing instruction restricted to execution at a secure subsystem of a processing device, assigning to the target processing instruction a secure address, associating the secure address with a secure address region of a non-transitory memory device of the processing device, and generating a secure partition table including the secure address.

20 Claims, 4 Drawing Sheets

SYSTEM AND METHOD FOR GENERATING SECURE PARTITION REGIONS IN OPEN AND SECURE PROCESSOR ENVIRONMENTS

TECHNICAL FIELD

The present implementations relate generally to secure processing systems, and more particularly to generating secure partition regions in open and secure processor environments.

BACKGROUND

Embedded and portable electronic systems are increasingly complex and are exposed to increasing security risks. In addition, demands for number of use cases for and flexibility of embedded and portable computer systems are increasingly expanding. Embedded and portable computer system are increasingly requested to store, access, and manage sensitive information in a wide variety or scenarios, while also supporting open and flexible application operation. However, conventional systems may not effectively partition secure data, operations, and instructions from unauthorized access. Thus, a technological solution for generating secure partition regions in open and secure processor environments is desired.

SUMMARY

Example implementations includes a method of partitioning a non-transitory memory device by detecting a boot state of a processing device including a non-transitory memory device, identifying a startup state of the processing device based on the boot state, and partitioning the memory device into at least one secure address region, in accordance with a determination that the startup state satisfies an operating state condition.

Example implementations also include a method of generating a secure partition associated with a non-transitory memory device by identifying a target processing instruction restricted to execution at a secure subsystem of a processing device, assigning to the target processing instruction a secure address, associating the secure address with a secure address region of a non-transitory memory device of the processing device, and generating a secure partition table including the secure address.

Example implementations also include a system with a boot loader configured to detect a boot state, and to identify a startup state based on the boot state, a partition register operatively coupled to the boot loader and configured to partition the memory device into at least one secure address region, in accordance with a determination that the startup state satisfies an operating state condition, and a system processor operatively coupled to the boot loader, configured to write to the partition register a partition address associated with the secure address region in accordance with a determination that the startup state satisfies an operating state condition, and further configured to enter an operation state of the processing device in accordance with a determination that the startup state does not satisfy the operating state condition.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some implementations, secure embedded processing systems includes both system regions accessible to all processing requests, and secure system regions accessible only to secure operations, objects, and the like. In some implementations, access to secure system memory regions is restricted, enforced, and the like by hardware limiting or prevents direct addressing of secure memory addresses. To increase security and minimize risk of infiltration into secure memory regions, it is advantageous to generate secure partitions defining secure memory regions to include all secure access operations, objects, and the like, while excluding all other operations, objects, and the like that may be used to access secure regions through improper or unintended execution. It is further advantageous to automatically generate secure partitions in cooperation with generation of processor instructions for both system and secure operations, to accurately include all secure functions in secure memory regions while accurately excluding all system functions from secure memory regions.

Figure 1:
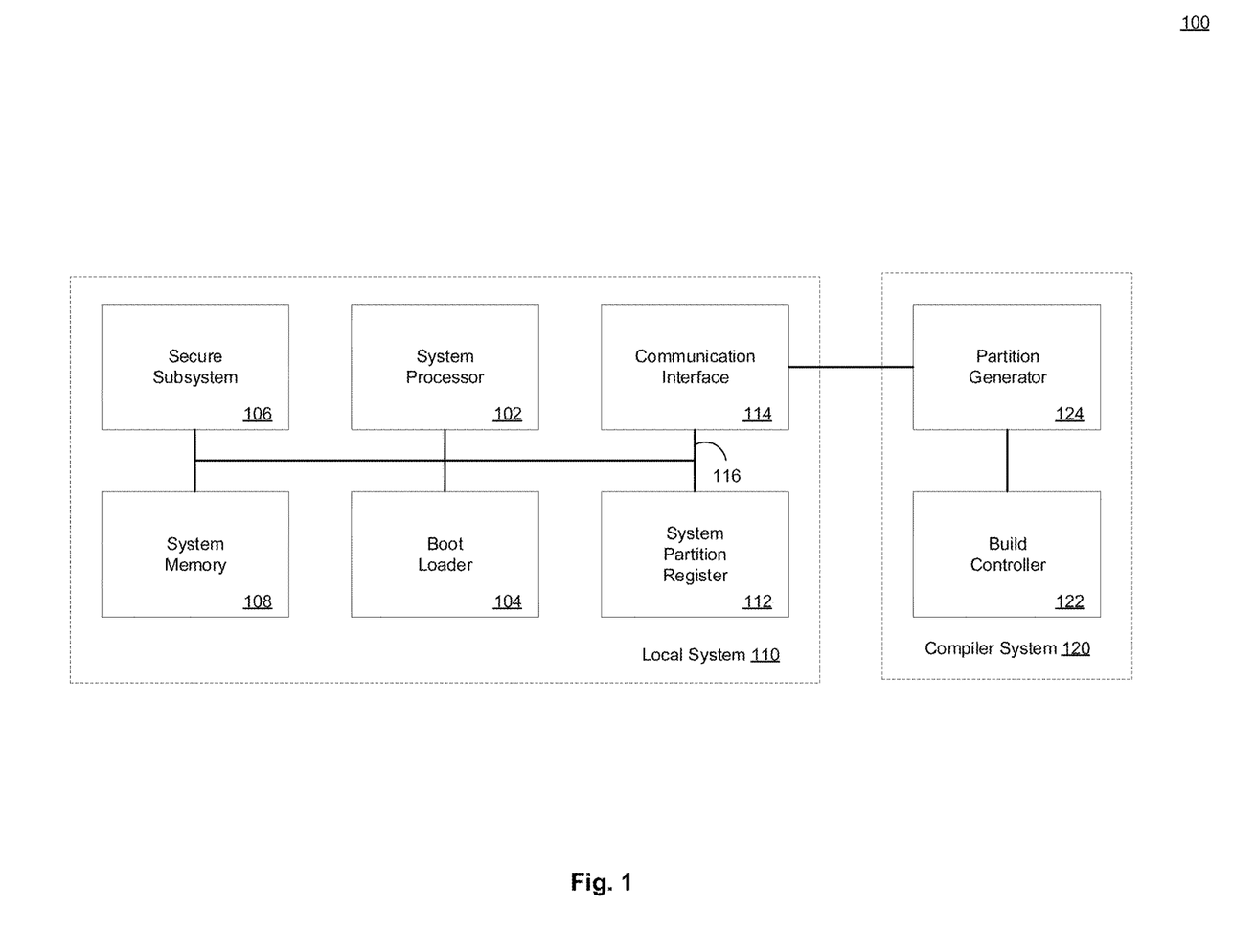
FIG. 1 illustrates an example system in accordance with present implementations.

FIG. 1 illustrates an example system in accordance with present implementations. As illustrated by way of example in FIG. 1, an example system 100 includes at least one of a local system 110 and a compiler system 120. In some implementations, the local system 110 includes a system processor 102, a boot loader 104, a secure subsystem 106, a system memory 108, a communication interface 114, a system partition register 112, and a system bus 116. In some implementations, the local system 110 includes an electronic circuit board, printed circuit board, conductive substrate, or the like. In some implementations, the compiler system 120 includes a build controller 122 and partition generator 124. In some implementations, the compiler system 120 includes a personal computer, server computer, or the like operatively coupled or operatively couplable to the local system 110 by one or more wired, wireless, digital, network, or like connections.

The system processor 102 is operable to execute one or more instructions associated with the local processing system 110. In some implementations, the system processor 102 is an electronic processor, an integrated circuit, or the like including one or more of digital logic, analog logic, digital sensors, analog sensors, communication buses, volatile memory, nonvolatile memory, and the like. In some implementations, the system processor 102 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 102 includes a memory operable to store or storing one or more instructions for operating components of the system processor 102 and operating components operably coupled to the system processor 102. In some implementations, the one or more instructions include at least one of firmware, software, hardware, operating systems, embedded operating systems, and the like. It is to be understood that the system processor 102 or the local system 110 generally can include at least one communication bus controller to effect communication between the system processor 102 and the other elements of the local system 110.

The boot loader 104 is operable to execute one or more instructions to operate, initialize, start, restart, shut down, sleep, or the like, one or more of the local system 110, the system processor 102, the secure subsystem 106, the system memory, and the communication interface 114. In some implementations, the boot firmware includes one or more electrical, electronic, and logical devices. In some implementations, the boot firmware includes one or more integrated circuits, transistors, transistor arrays, or the like. In some implementations, the boot firmware includes one or more boot instructions, boot loaders, or the like. In some implementations, the boot loader 104 includes, is coupled to, is couplable to, or the like, one or more hardware switches, jumper pins, jumpers, fuses, or the like operable to set, select, determine, control, or the like one or more boot states. In some implementations, the boot loader 104 is operable to detect one or more startup states based at least partially on one or more hardware switches, jumper pins, jumpers, fuses, or the like.

The secure subsystem 106 is operable to perform processing, storage, retrieval, and the like inaccessible to one or more of the system processor 102, the boot loader 104, the system memory 108, the communication interface 114, the system partition register 112, and the compiler system 120. In some implementations, the secure subsystem 106 includes restrictions on access to one or more memory devices, memory locations, memory addresses and the like. In some implementations, the secure subsystem 106 includes restrictions on access to one or more processing devices, processing functions, and the like. In some implementations, the secure subsystem 106 stores or is operable to store information received at the local system 110 by the communication interface 114. As one example, the secure subsystem 106 can store passwords, financial information, encryption keys, user identification information, security tokens, and the like. In some implementations, the secure subsystem 106 or one or more component thereof are controllably modifiable by at least one of the system partition register 112 and the compiler system 120. Thus, in some implementations, the secure subsystem 106 can perform one or more functions inaccessible to any device or system outside of the secure subsystem 106.

The system memory 108 is operable to store data associated with the local system 110. In some implementations, the system memory 108 includes ones or more hardware memory devices for storing binary data, digital data, or the like. In some implementations, the system memory 108 includes one or more electrical components, electronic components, programmable electronic components, reprogrammable electronic components, integrated circuits, semiconductor devices, flip flops, arithmetic units, or the like. In some implementations, the system memory 108 includes at least one of a non-volatile memory device, a solid-state memory device, a flash memory device, and a NAND memory device. In some implementations, the system memory 108 includes one or more addressable memory regions disposed on one or more physical memory arrays. In some implementations, one or more addressable memory regions of the system memory 108 are controllably modifiable by the at least one of the system partition register 112 and the compiler system 120. In some implementations, a physical memory array includes a NAND gate array disposed on a particular semiconductor device, integrated circuit device, printed circuit board device, and the like.

The system partition register 112 is operable to control, restrict, or the like, access to the system memory 108 by the system processor 102. In some implementations, the system partition register 112 includes one or more electrical components, electronic components, programmable electronic components, reprogrammable electronic components, integrated circuits, semiconductor devices, flip flops, arithmetic units, or the like. In some implementations, the system partition register 112 includes at least one of a non-volatile memory device, a solid-state memory device, a flash memory device, and a NAND memory device. In some implementations, the system partition register 112 includes one or more memory addresses associated with the system memory 108. In some implementations, the system partition register 112 controls memory addresses of the system memory directly addressable by the system processor 102. In some implementations, the system partition register 112 defines a logical portion, subset, or the like, of the system memory 108 available for direct addressing by the system processor 112. It is to be understood that the system partition register 112 can be optionally included to explicitly define memory addresses directly addressable by the system processor 112. Alternatively, it is to be understood that the system processor 112 can directly address any memory address not explicitly associated with the secure subsystem 106 in some implementations.

In some implementations, the system partition register 112 defines one or more ranges of addresses identifying or restricting memory addresses of the system memory 108 directly addressable by the system processor 102. In some implementations, the system partition register 112 includes one or more pairs of addresses defining contiguous address ranges, block, or the like directly addressable by the system processor 102. As one example, the system partition register 112 can include a first address pair including a first address 0000F000 and a second address 00F00000 defining an address range therebetween directly addressable by the system processor 102. In some implementations, the system partition register 112 includes multiple pairs of memory addresses identifying noncontiguous memory blocks. As one example, the system partition register 112 can include a second address pair including a third address 00F01000 and a fourth address 00F0F000 defining an address range therebetween directly addressable by the system processor 102, in addition to the first address pair. In some implementations, the system processor 102 is restricted, prevented, or the like, from directly addressing any memory address outside of any address range stored by the system partition register 112. In some implementations, the system memory 102 is a logical subset of a physical memory array, and is defined by memory addresses stored by the system partition register 112.

The communication interface 114 is operable to communicatively couple the local system 110 to the compiler system 120. In some implementations, the communication interface 114 includes one or more wired interface devices, channels, and the like. In some implementations, the communication interface includes, is operably coupled to, or is operably couplable to an I2C, UART, or like communication interface by one or more external devices, systems, or the like. The system bus 116 is operable to communicate one or more instructions, signals, conditions, states, or the like between one or more of the system processor 102, the boot loader 104, the system memory 108, the system partition register 112, the communication interface 114, and the compiler system 120. In some implementations, the system bus 116 includes one or more digital, analog, or like communication channels, lines, traces, or the like.

The build controller 122 is operable to generate one or more machine readable instructions executable by the system processor 102 and the secure subsystem 106. In some implementations, the build controller includes at least one of an integrated development environment (IDE), a compiler, a linker, and an assembler of high level instructions associated with at least one of the system processor 102 and the secure subsystem 106. In some implementations, high level instructions include computer programming code written in at least one computer programming language. As one example, high level instructions can be written in C++ or the like. In some implementations, the build controller 122 is operable to generate one or more machine-readable instructions executable by the system processor 102 or the secure subsystem 106. In some implementations, the build controller 122 generates a single instruction set including all instructions executable by the system processor 102 and the secure subsystem 106. In some implementations, the instruction set includes one or more identifiers of one or more operations, functions, headers, objects, classes, data, and the like. As one example, the single instruction set can include an ELF file. As another example, the ELF file can include one or more header sections describing one or more functions, headers, objects, classes, data, and the like.

The partition generator 124 is operable to generate at least one partition table identifying one or more memory locations directly addressable by one or more of the system processor 102 and the secure subsystem 106. In some implementations, the partition generator 124 is operable to generate a system memory region of the system memory 108 directly addressable by the system processor 102. In some implementations, the partition generator 124 is operable to generate a secure memory region of the secure subsystem 106 not directly addressable by the system processor 102. In some implementations, the partition generator 124 is operable to generate a secure access memory region of the secure subsystem directly addressable by the system processor 102. In some implementations, the partition generator 124 generates one partition table defining access control, restrictions, and the like, to the system memory region, the secure memory region, and the secure access memory region. Alternatively, in some implementations, the partition generator 124 generates multiple partition tables each defining access control, restrictions, and the like, respectively to one or more of the system memory region, the secure memory region, and the secure access memory region. As one example, the partition generator 124 can generate a system partition table defining the system memory region, and can generate a secure partition table defining the secure memory region and the secure access memory region.

Figure 2:
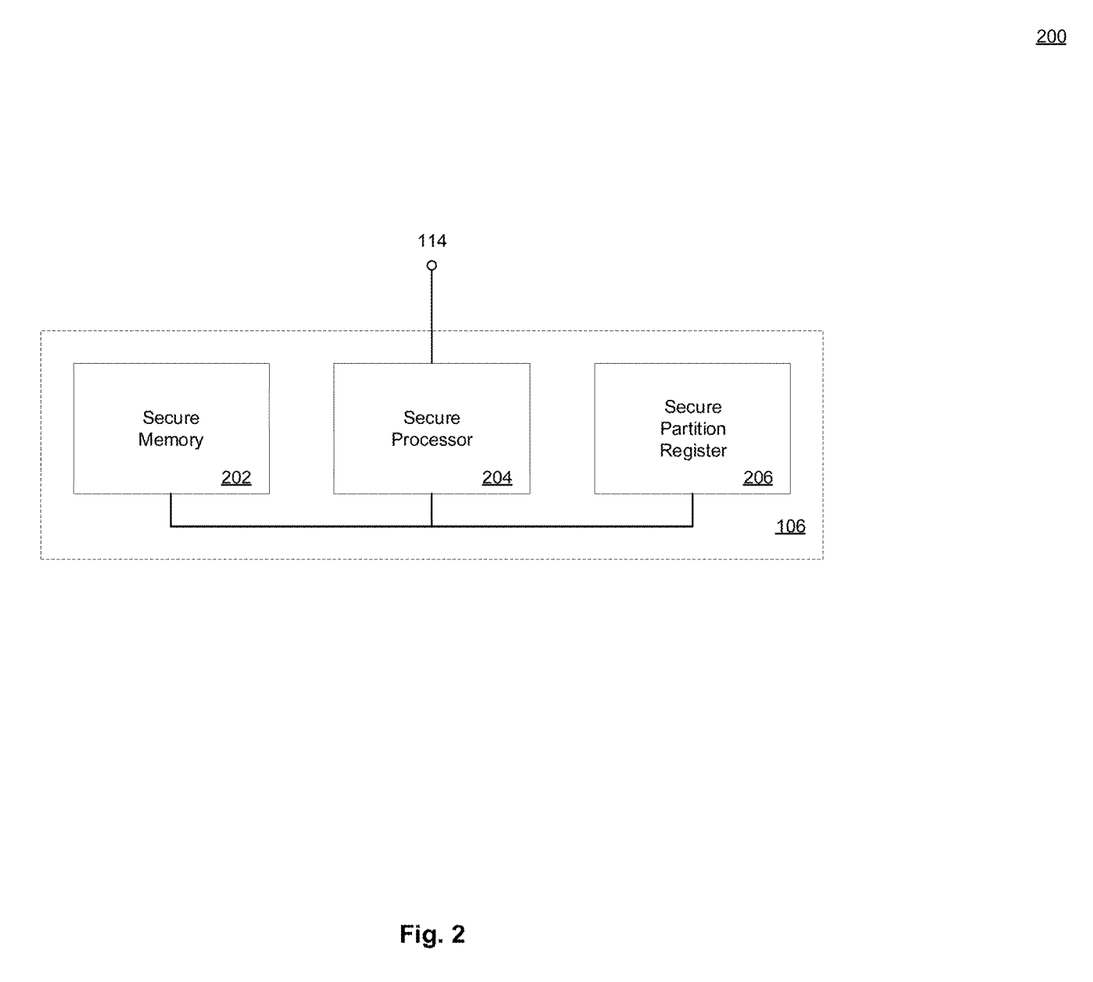
FIG. 2 illustrates an example secure subsystem in accordance with the system of FIG. 1.

FIG. 2 illustrates an example secure subsystem in accordance with the example system of FIG. 1. As illustrated by way of example in FIG. 2, an example secure subsystem 200 includes a secure memory 202, a secure processor 204, and a secure partition register 206. In some implementations, the secure subsystem 106 includes the secure subsystem 200.

The secure memory 202 is operable to store data associated with the secure subsystem 200. In some implementations, the secure subsystem 200 limits or prevents access to at least a portion of the secure memory 202 from the local processing system 110. In some implementations, the secure subsystem 200 limits or prevents direct addressing of at least a portion of the secure memory 202 from the local processing system 110. In some implementations, the secure memory 202 includes ones or more hardware memory devices for storing binary data, digital data, or the like. In some implementations, the secure memory 202 includes one or more electrical components, electronic components, programmable electronic components, reprogrammable electronic components, integrated circuits, semiconductor devices, flip flops, arithmetic units, or the like. In some implementations, the secure memory 202 includes at least one of a non-volatile memory device, a solid-state memory device, a flash memory device, and a NAND memory device. In some implementations, the secure memory 202 includes one or more addressable memory regions disposed on one or more physical memory arrays. In some implementations, one or more addressable memory regions of the system memory 108 are controllably modifiable by the at least one of the secure partition register 206 and the compiler system 120. In some implementations, the secure memory 202 includes a logical secure access region directly addressable from the local processing region 202. In some implementations, the secure memory 202 is a resizable logical portion, partition, region, or the like, of the system memory 108. In some implementations, a physical memory array includes a NAND gate array disposed on a particular semiconductor device, integrated circuit device, printed circuit board device, and the like.

The secure processor 204 is operable to execute one or more instructions associated with the secure subsystem 200. In some implementations, the secure processor 204 limits or prevents access to at least a portion of the secure memory 202 from the local processing system 110. In some implementations, the secure processor 204 limits or prevents direct addressing of at least a portion of the secure memory 202 from the local processing system 110. In some implementations, the secure processor 204 is operable to perform one or more processing operations associated with restricted or preventing access to the secure subsystem 200. In some implementations, the secure processor is operatively coupled to the system bus 114. In some implementations, the secure processor 204 includes one or more devices in accordance with the system processor 102.

The secure partition register 206 is operable to control, restrict, or the like, access to the secure memory 202 by one or more of the system processor 102 and the local processing system 110. In some implementations, the secure partition register 206 includes one or more electrical components, electronic components, programmable electronic components, reprogrammable electronic components, integrated circuits, semiconductor devices, flip flops, arithmetic units, or the like. In some implementations, the secure partition register 206 includes at least one of a non-volatile memory device, a solid-state memory device, a flash memory device, and a NAND memory device. In some implementations, the secure partition register 206 includes one or more memory addresses associated with the secure memory 202. In some implementations, the secure partition register 206 controls memory addresses of the secure memory 202 directly addressable by the system processor 102 as a secure access region of the secure memory 202. In some implementations, the secure partition register 206 defines a logical portion, subset, or the like, of the secure memory 202 available for direct addressing by the secure processor 204. It is to be understood that the secure partition register 206 can be optionally included to explicitly define memory addresses directly addressable by the secure processor 204. Alternatively, it is to be understood that the secure processor 204 can directly address any memory address explicitly associated with the secure subsystem 106 by the system partition register 112 in some implementations.

In some implementations, the secure partition register 206 defines one or more ranges of addresses identifying or restricting memory addresses of the secure memory 202 directly addressable by the system processor 102. In some implementations, the secure partition register 206 includes one or more pairs of addresses defining contiguous address ranges, block, or the like directly addressable by the system processor 102. As one example, the secure partition register 206 can include a first address pair including a first address 00001000 and a second address 0000FFFF defining an address range therebetween directly addressable by the system processor 102. In some implementations, the secure partition register 206 includes multiple pairs of memory addresses identifying noncontiguous memory blocks. As one example, the secure partition register 206 can include a second address pair including a third address 1000000 and a fourth address F0000000 defining an address range therebetween directly addressable by the system processor 102, in addition to the first address pair. In some implementations, the system processor 102 is restricted, prevented, or the like, from directly addressing any memory address within any address range stored by the secure partition register 206. In some implementations, the system processor 102 is permitted to directly address any memory address within any address range stored by the secure partition register 206 and associated with the secure access memory region. In some implementations, the secure memory 202 is a logical subset of a physical memory array, and is defined by memory addresses stored by the secure partition register 206.

Figure 3:
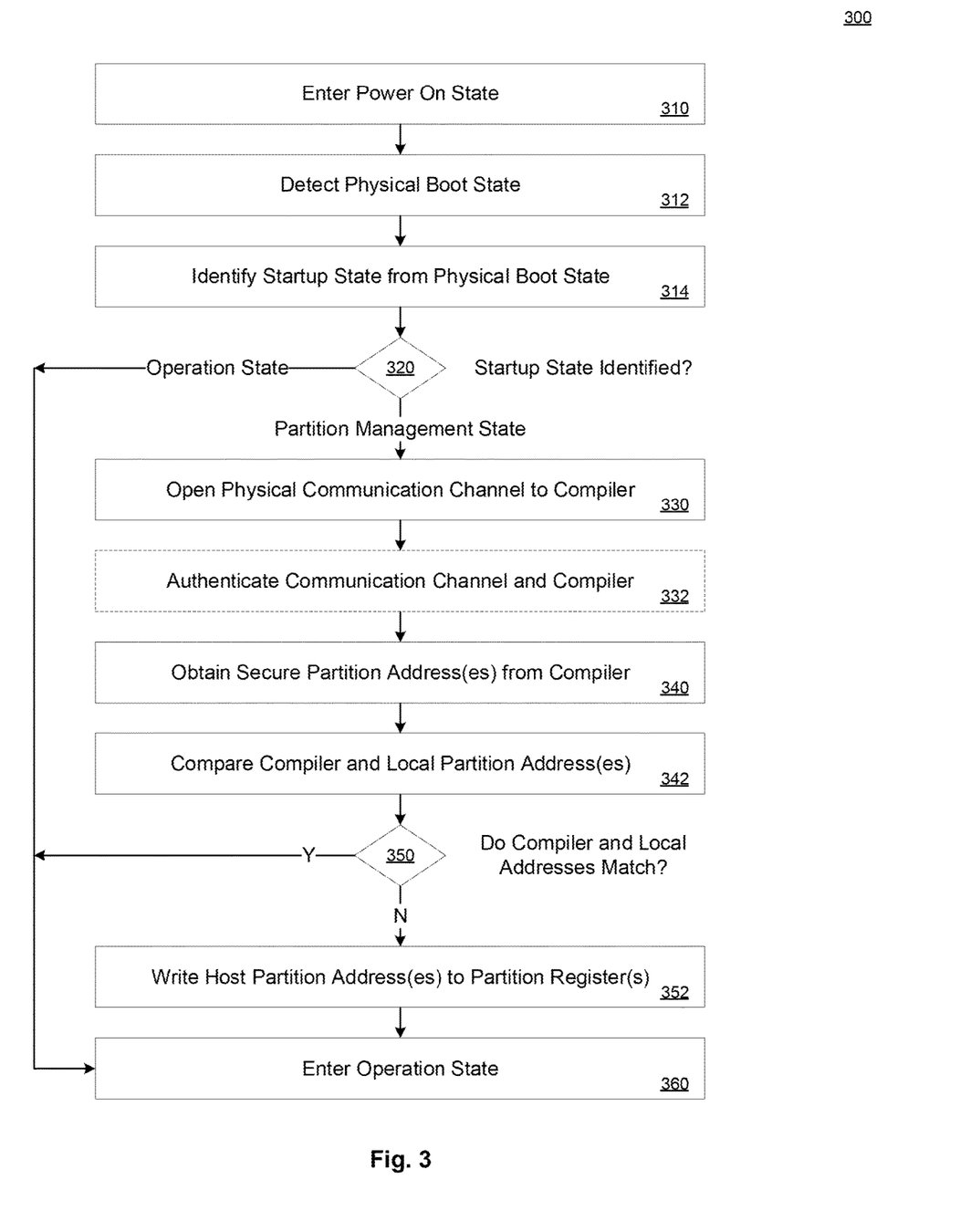
FIG. 3 illustrates an example method of partitioning a non-transitory memory device into secure and system address regions in accordance with present implementations.

FIG. 3 illustrates an example method of partitioning a non-transitory memory device into secure and system address regions in accordance with present implementations. In some implementations, the example system 100 performs method 300 according to present implementations. In some implementations, the method 300 begins at step 310.

At step 310, the example system enters a power on state. In some implementations, at least one of the system processor 102 and the boot loader 104 enters the power on state. In some implementations, a power on states includes a firmware boot, a power on self-test, a register clear, and the like. In some implementations, a power on state is controlled by one or more hardware device settings including but not limited to hardware switches, jumpers, and the like. In some implementations, the example system enters a power on state based on application of electrical power by a power on signal, a hardware switch delivering electrical power to the local processing system 110, and the like. The method 300 then continues to step 312.

At step 312, the example system detects a physical boot state. In some implementations, the boot loader 104 detects the physical boot state. In some implementations, the physical boot state is set by a particular configuration of a hardware switch, jumper pin, jumper connection, and the like. In some implementations, the particular configuration is set prior to the power on state. In some implementations, the boot loader 104 detects the physical boot state by detecting the state of a switch associated with the boot state. The method 300 then continues to step 314. At step 314, the example system identifies a startup state based at least partially on the physical boot state. In some implementations, the boot loader 104 identifies the startup state. In some implementations, the boot loader 104 identifies the startup state by detecting whether a boot jumper pin is open. The method 300 then continues to step 320.

At step 320, the example system determines whether the identified startup state corresponds to an operation state. In some implementations, an open boot jumper pin configuration is associated with a partition management state, and a closed boot jumper pin is associated with an operation state. In some implementations, the example system is locked into an immutable partition table by soldering or the like the boot jumper pin closed to prevent further entry into the partition management state. As one example, a developer can download a partition table associated with a particular secure application, and can solder closed the boot jumper pin to prevent any tampering with the partition table and its security restrictions on directly addressing various secure memory addresses. In accordance with a determination that the identified startup state corresponds to an operation state, the method 300 continues to step 360. Alternatively, in accordance with a determination that the identified startup state does not correspond to an operation state, the method 300 continues to step 330.

At step 330, the example system opens a physical communication channel to a compiler system. In some implementations, the communication interface 114 opens a physical communication channel to the compiler system 120. In some implementations, the communication interface 114 opens a physical communication channel to the compiler system 120 by a wired connection including but not limited to an I2C connection, a UART connection, and the like. It is to be understood that the communication interface can alternatively open a wireless communication channel to the compiler system in some implementations. The method 300 then continues to step 332.

At step 332, the example system authenticates at least one of the communication channel and the compiler system. In some implementations, at least one of the system processor 102 and the secure subsystem 106 authenticates at least one identifier associated with at least of the communication channel between the local system 110 and the compiler system 120, the compiler system 120, the application user, and the like. In some implementations, at least one of the system processor 102 and the secure subsystem 106 authenticates at least one security protocol, protection, restriction, or the like associated with at least of the communication channel between the local system 110 and the compiler system 120, the compiler system 120, the application user, and the like. In some implementations, an identifier includes an access token, an authentication key, a public key, and the like. In some implementations, a security protocol, protection, restriction, or the like includes an encryption key, an encryption validation process, and the like. It is to be understood that in some implementations, the example system optionally authenticates the communication channel or the compiler system. The method 300 then continues to step 340.

At step 340, the example system obtains one or more secure partition addresses from the compiler system by the communication channel. In some implementations, the local system 110 obtains at least one partition table from the compiler system 120 by the communication interface 114. In some implementations, the partition table includes one or more addresses defining a system memory region of the system memory 108. In some implementations, the partition table includes one or more addresses defining a secure memory region of the secure memory 202. In some implementations, the partition table includes one or more addresses defining a secure access memory region of the secure memory 202. The method 300 then continues to step 342. At step 342, the example system compares one or more secure partition addresses from the compiler system with one or more secure partition addresses at the local system. In some implementations, at least one of the system processor 102, the boot loader 104, and the secure subsystem 106 compares the secure partition addresses from the compiler system 120 with secure partition addresses at one or more of the system partition register 112 and the secure partition register 206. It is to be understood that the example system optionally compares secure partition addresses if no secure partition addresses are stored on the system partition register 112 and the secure partition register 206. It is to be further understood that the example system optionally compares secure partition addresses if one or more of the local processing system 110 and the compiler system 120 to force an update, flush, overwrite, or the like, of one or more of the system partition register 112 and the secure partition register 206. The method 300 then continues to step 350.

At step 350, the example system determines whether one or more partition addresses from the compiler system correspond to one or more partition addresses at the local system. In some implementations, at least one of the system processor 102, the boot loader 104, and the secure subsystem 106 determines whether any secure partition addresses from the compiler system 120 differ from any preexisting secure partition addresses at the local system 110. In some implementations, at least one of the system processor 102, the boot loader 104, and the secure subsystem 106 also optionally determines whether any system partition addresses from the compiler system 120 differ from any preexisting system partition addresses at the local system 110. In some implementations, at least one of the system processor 102, the boot loader 104, and the secure subsystem 106 also optionally determines whether any secure access partition addresses from the compiler system 120 differ from any preexisting secure access partition addresses at the local system 110.

In accordance with a determination that one or more secure partition addresses from the compiler system corresponds to one or more secure partition addresses at the local system, the method 300 continues to step 360. In some implementations, the method 300 continues to step 360 if all partition addresses from the compiler system 120 match all partition addresses preexisting at the local system 110. Alternatively, in accordance with a determination that one or more secure partition addresses from the compiler system do not correspond to one or more secure partition addresses at the local system, the method 300 continues to step 352. In some implementations, the method 300 continues to step 352 if any partition addresses from the compiler system 120 do not match any partition addresses preexisting at the local system 110. In some implementations, any additional partition addresses received from the compiler system 120 results in a determination that addressed do not correspond. In some implementations, any partition addresses preexisting at the local system 110 not included in partition addresses received from the compiler system 120 results in a determination that addressed do not correspond.

At step 352, the example system writes one or more partition addresses to one or more partition registers at the local system and at the secure subsystem of the local system. In some implementations, at least one of the system processor 102 and the boot loader 104 writes system partition addresses to the system partition register 112. In some implementations, at least one of the secure subsystem 106 and the boot loader 104 writes secure partition addresses to the secure partition register 206. In some implementations, at least one of the secure subsystem 106 and the boot loader 104 writes secure access partition addresses to the secure partition register 206. The method 352 then continues to step 360. At step 360, the example system enters an operation state. In some implementations, the local system 110 enters the operation state allowing execution of application instructions stored on the system memory 108. In some implementations, the local system 110 receives application instructions concurrently with receiving partition tables by the communication interface 114. In some implementations, the local system 110 directly enters the operation state. Alternatively, in some implementations, the local system enters the operation states after returning to the power on state, another intervening state, or a combination thereof. In some implementations, the method 300 ends at step 360.

Figure 4:
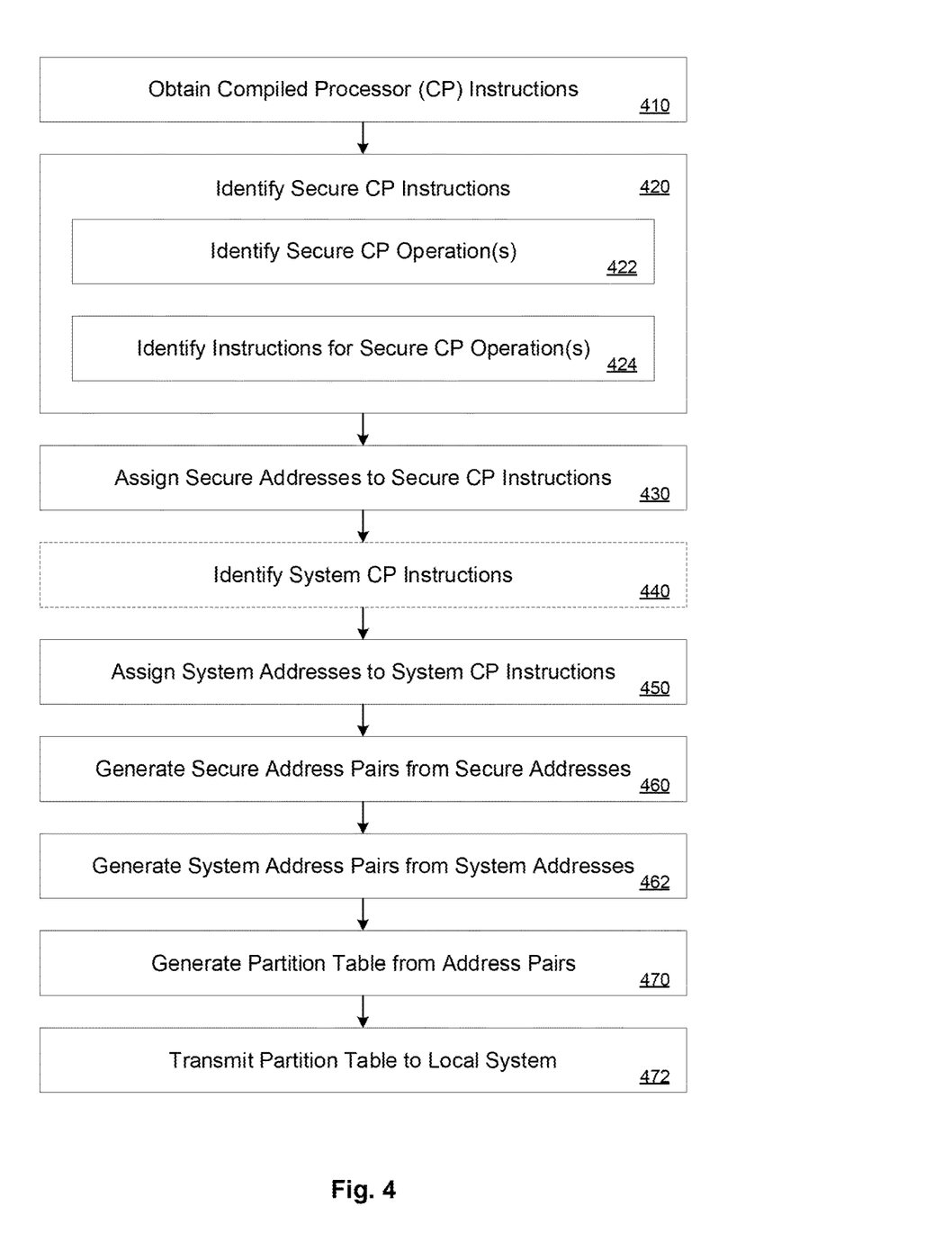
FIG. 4 illustrates a further example method of partitioning a non-transitory memory device into secure and system address regions in accordance with present implementations.

FIG. 4 illustrates a further example method of partitioning a non-transitory memory device into secure and system address regions in accordance with present implementations. In some implementations, the example system 100 performs method 400 according to present implementations. In some implementations, the method 400 begins at step 410.

At step 410, the example system obtains one or more compiled processor instructions. In some implementations, at least one of the build controller 122 and the partition generator 124 obtains the compiled processor instructions. In some implementations, the build controller 122 obtains the compiled processor instructions by generating compiled processor instructions based on high level code instructions. Alternatively, in some implementations, the partition generator 124 obtains the compiled processor instructions by receiving compiled processor instructions generated by a compiler device or system distinct from the build controller 122. The method 400 then continues to step 420.

At step 420, the example system identifies one or more secure processor instructions based at least partially on the compiled processor instructions. In some implementations, the partition generator 124 identifies the secure processor instructions. In some implementations, the partition generator 124 directly identifies compiled instructions requesting access to one or more of the secure memory 202, a secure object, a secure operation, and the like. In some implementations, step 420 includes at least one of steps 422 and 424. At step 422, the example system identifies one or more secure processor operations. In some implementations, the partition generator 124 parses, traverses, reads, or the like, a set of compiled processor instructions identifying one or more compiled processor operations. In some implementations, a set of compiled processor instructions includes an ELF file, and identifies compiled process operations as compiled function headers therein. At step 424, the example system identifies one or more secure instructions associated with the identified secure processor operations. In some implementations, the example system associates, groups, collects, or the like, one or more instructions associated with each compiled processor operation. As one example, the partition generator 124 can identify a compiled function based on the ELF file header, and can associate multiple compiled instructions associated with one or more of the function header and its corresponding function body. In some implementations, the partition generator 124 identifies secure compiled processor instructions based on association with function headers or function bodies requesting access to one or more of the secure memory 202, a secure object, a secure operation, and the like. In some implementations, the partition generator 124 identifies secure access compiled processor instructions based on association with function headers or function bodies requesting access to one or more of a secure access object, a secure access operation, and the like. The method 400 then continues to step 430.

At step 430, the example system assigns one or more secure addresses to one or more corresponding compiled processor instructions. In some implementations, the partition generator 124 assigns secure addresses associated with the secure memory 202. In some implementations, the partition generator 124 assigns secure addresses to compiled processor instructions associated with secure devices, data, functions, or the like of the secure subsystem 106. The method 400 then continues to step 440.

At step 440, the example system identifies one or more system processor instructions. In some implementations, the partition generator 124 identifies the system processor instructions. In some implementations, the partition generator 124 directly identifies compiled instructions operating independent of or separate from one or more of the secure memory 202, a secure object, a secure operation, and the like. In some implementations, the example system identifies the system processor instructions correspondingly to identifying the secure compiled processor instructions. Alternatively, in some implementations, the example system identifies system processor instructions as any instructions not identified as secure processor instructions. The method 400 then continues to step 450.

At step 450, the example system assigns one or more system addresses to one or more corresponding system processor instructions. In some implementations, the partition generator 124 assigns system addresses associated with the system memory 108. In some implementations, the partition generator 124 assigns secure addresses to compiled processor instructions accessing devices, data, functions, or the like independent of or separate from the secure subsystem 106. Alternatively, in some implementations, the example system assigns system addresses to any system processor instructions not identified as secure processor instructions. The method 400 then continues to step 460.

At step 460, the example system generates one or more secure address pairs based at least partially on one or more secure addresses. In some implementations, the partition generator 124 generates one or more secure address pairs including all secure addresses. In some implementations, the partition generator 124 minimizes the number of memory addresses associated with the secure memory 202 by generating address pairs including only all secure addresses. In some implementations, the partition generator 124 generates one or more secure access address pairs including all secure access addresses. In some implementations, the partition generator 124 minimizes the number of memory addresses associated with the secure memory 202 by generating address pairs including only all secure access addresses. The method 400 then continues to step 462. At step 462, the example system generates one or more system address pairs based at least partially on one or more system addresses. In some implementations, that example system generates system address pairs correspondingly to generating secure address pairs. Alternatively, in some implementations, the example system generates system address pairs including all addresses excluding all secure address pairs and secure access address pairs. Thus, in some implementations, system address pairs include all memory addresses not associated with secure address or secure access addresses. The method 400 then continues to step 470.

At step 470, the example system generates a partition table based at least partially on one or more of the secure address pairs and the system address pairs. In some implementations, the partition generator 124 generates one or more partition tables including one or more of the system address pairs, the secure address pairs, and the secure access address pairs. The method 400 then continues to step 472. At step 472, the example system transmits the partition table to the local system. In some implementations, one or more of the partition generator 124 and the compiler system 120 transmits the partition table to the local system 110 by the communication interface 114. In some implementations, the method 400 ends at step 472.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of partitioning a non-transitory memory device, the method comprising:
    detecting a boot state of a processing device including a non-transitory memory device;
    identifying a startup state of the processing device based on the boot state;
    obtaining, from an external device and in accordance with a determination that the startup state satisfies an operating state condition, one or more addresses of the non-transitory memory device corresponding to at least one secure address region; and
    partitioning the memory device into the at least one secure address region, in accordance with the determination that the startup state satisfies the operating state condition.

2. The method of claim 1, wherein the partitioning the memory device further comprises writing a first partition address to a partition register of the processing device associated with the secure address region.

3. The method of claim 2, wherein the first partition address is associated with a processing instruction restricted to execution at a secure subsystem of the processing device.

4. The method of claim 2, further comprising:
    obtaining the first partition address from the external device at the processing device, in accordance with the determination that the startup state satisfies the operating state condition.

5. The method of claim 4, wherein the obtaining the first partition address comprises obtaining the first partition address from a compiler system.

6. The method of claim 5, further comprising:
    authenticating a communication from the compiler system to the processing device, the communication including first partition address.

7. The method of claim 2, wherein the writing the first partition address further comprises writing the first partition address to the partition register of the processing device, in accordance with a determination that the first partition address satisfies an address condition.

8. The method of claim 7, wherein the determination that the first partition address satisfies the address condition comprises a determination that the first partition address does not match a second partition address at the partition register.

9. The method of claim 1, further comprising:
entering an operation state of the processing device, in accordance with a determination that the startup state does not satisfy the operating state condition.

10. A method of generating a secure partition associated with a non-transitory memory device, the method comprising:
identifying a target processing instruction restricted to execution at a secure subsystem of a processing device;
assigning to the target processing instruction a secure address;
associating the secure address with a secure address region of a non-transitory memory device of the processing device;
generating a secure partition table including the secure address; and
transmitting, to the processing device, the secure address associated with the secure address region.

11. The method of claim 10, wherein the identifying the target processing instruction comprises identifying the target processing instruction from among a plurality of compiled processing instructions.

12. The method of claim 10, wherein the identifying the target processing instruction comprises identifying a compiled secure processing operation associated with the target processing instruction.

13. The method of claim 12, wherein the secure address comprises a first plurality of addresses associated with the compiled secure processing operation.

14. The method of claim 13, wherein the first plurality of addresses define a secure address range associated with the compiled secure processing operation.

15. The method of claim 13, wherein the plurality of addresses comprise a first secure operation address defining a lowest address in the secure address range, and a second secure operation address defining a highest address in the secure address range.

16. The method of claim 10, further comprising:
identifying a system processing instruction restricted to execution at a system processor of the processing device;
assigning to the system processing instruction a system address;
associating the system address with a system address region of a non-transitory memory device of the processing device; and
generating a system partition table including the system address.

17. The method of claim 16, wherein the identifying the system processing instruction further comprises identifying a compiled system processing operation associated with the system processing instruction.

18. The method of claim 17, wherein the system address comprises a second plurality of addresses associated with the compiled system processing operation.

19. The method of claim 17, wherein the second plurality of addresses define a secure address range associated with the compiled secure processing operation.

20. A system comprising:
a boot loader configured to detect a boot state, and to identify a startup state based on the boot state;
a partition register operatively coupled to the boot loader and configured to partition the memory device into at least one secure address region, in accordance with a determination that the startup state satisfies an operating state condition; and
a system processor operatively coupled to the boot loader, configured to obtain, from an external device and in accordance with a determination that the startup state satisfies an operating state condition, one or more addresses of the non-transitory memory device corresponding to at least one secure address region, write to the partition register a partition address associated with the secure address region in accordance with the determination that the startup state satisfies the operating state condition, and further configured to enter an operation state of the processing device in accordance with a determination that the startup state does not satisfy the operating state condition.

* * * * *